(12) United States Patent
Redden et al.

(10) Patent No.: US 7,316,721 B1
(45) Date of Patent: Jan. 8, 2008

(54) CERAMIC FOAM INSULATOR WITH THERMAL EXPANSION JOINT

(75) Inventors: Myron K. Redden, Hendersonville, NC (US); Rudolph A. Olson, III, Hendersonville, NC (US)

(73) Assignee: Porvair, PLC (GB)

( * ) Notice: Subject to any disclaimer, the term of this patent is extended or adjusted under 35 U.S.C. 154(b) by 470 days.

(21) Appl. No.: 11/045,195

(22) Filed: Jan. 28, 2005

Related U.S. Application Data

(60) Provisional application No. 60/543,013, filed on Feb. 9, 2004.

(51) Int. Cl.
*B01D 35/00* (2006.01)
*B01D 46/00* (2006.01)

(52) U.S. Cl. .......... 55/428; 55/385.1; 55/429; 55/431; 55/482; 55/484; 55/523; 55/529; 406/89; 406/172

(58) Field of Classification Search ........ 55/385.1, 55/428, 429, 431, 482, 484, 522, 523, 529; 96/262, 326, 327; 406/46, 48, 89, 172, 193; 138/114

See application file for complete search history.

(56) References Cited

U.S. PATENT DOCUMENTS

| | | | | |
|---|---|---|---|---|
| 3,040,760 | A * | 6/1962 | Macks | 406/46 |
| 4,116,491 | A * | 9/1978 | Ply | 406/89 |
| 4,664,863 | A * | 5/1987 | Venable, Jr. | 264/262 |
| 5,045,511 | A | 9/1991 | Bosomworth et al. | 501/85 |
| 5,072,094 | A | 12/1991 | Foster et al. | 219/390 |
| 5,163,787 | A * | 11/1992 | Bjorklund et al. | 406/89 |
| 5,195,319 | A * | 3/1993 | Stobbe | 55/523 |
| 5,209,657 | A * | 5/1993 | Benck et al. | 432/99 |
| 5,399,179 | A * | 3/1995 | Rehwinkel et al. | 55/341.1 |
| 5,722,802 | A * | 3/1998 | March | 406/46 |
| 5,935,283 | A * | 8/1999 | Sweeney et al. | 55/431 |
| 5,955,037 | A | 9/1999 | Holst et al. | 422/171 |
| 6,227,768 | B1 * | 5/2001 | Higuchi et al. | 406/89 |
| 6,364,957 | B1 * | 4/2002 | Schneider et al. | 118/728 |
| 6,583,980 | B1 | 6/2003 | Wang et al. | 361/234 |
| 6,673,323 | B1 | 1/2004 | Bhatnagar et al. | 423/210 |
| 6,719,500 | B2 * | 4/2004 | Pfeiffer et al. | 406/91 |
| 2006/0104879 | A1 * | 5/2006 | Chiu et al. | 423/245.3 |

* cited by examiner

*Primary Examiner*—Jason M. Greene
(74) *Attorney, Agent, or Firm*—Joseph T. Guy; Nexsen Pruet, LLC

(57) ABSTRACT

A canister for maintaining entrained particles in a gas stream passing there through. The canister has an outer annular member and an inner porous annular member. The inner porous annular member has rings with at least one expansion zone in each ring. An annular interior volume is between the outer annular member and the inner porous annular member. A gas source is in flow communication with the annular interior volume for providing gas at a pressure sufficient to pass through the inner porous annular member to dislodge particles adhering thereto.

20 Claims, 5 Drawing Sheets

CERAMIC FOAM INSULATOR WITH THERMAL EXPANSION JOINT

CROSS-REFERENCE TO RELATED APPLICATIONS

This application claims priority to U.S. Provisional Patent Appl. No. 60/543,013 filed Feb. 9, 2004 which is pending.

BACKGROUND OF THE INVENTION

The present invention is related to a ceramic foam insulator with a thermal expansion zone. More particularly, the present invention is related to an effluent gas treatment inlet system with ceramic foam insulator comprising a constant thickness thermal expansion zone.

Treatment of effluent gases is an ongoing problem in the chemical industry. Virtually every chemical process has materials which are undesirable and which must be neutralized, diluted or captured. When highly corrosive materials are utilized, or generated, the problem is magnified.

Particles entrained in an air stream create significant transport problems in a manufacturing environment. It is preferable to insure that all particles remain entrained until reaching the effluent gas treatment zone wherein the particles can be removed in a controlled fashion. Any area of flow disruption or transition tends to cause the particles to settle. A particular area of concern is the inlet of the effluent gas treatment system. It is not uncommon for entrained particles to settle in the inlet. As particles settle they further disrupt flow thereby increasing the rate of particle settling. This is not only undesirable but it is also potentially hazardous when corrosive or environmentally hazardous materials are involved.

A solution to particle settling is provided in U.S. Pat. No. 5,955,037 wherein described is a multi-walled inlet structure comprising an annular outer wall with a porous ceramic inner wall with an annular interior volume there between. Low-pressure gas feed lines in flow communication with the annular interior volume prohibit particle adhesion to the interior walls of the inlet. To the extent that particles still adhere auxiliary high-pressure gas feed lines are suitable for dislodging particles that have adhered. U.S. Pat. No. 5,955,037 is incorporated herein by reference.

The multi-walled structure with interior porous ceramic has proven highly reliable for use in an inlet structure with regards to substantially decreasing particle adhesion. Unfortunately, the structure still has deficiencies which have limited the use in certain instances.

In many manufacturing processes the effluent passing through the inlet has a very high temperature. In practice, the temperature fluctuation causes the porous ceramic to expand and contract. As would be readily realized the expansion and contraction leads to structural cracks and eventual breakage of the porous ceramic interior walls. This is highly undesirable due to the cost and the down time associated with replacing the ceramic.

The use of expansion slots in ceramics is known particularly in heating elements, substrate supports and the like. For the present application expansion slots have not been considered acceptable since the slot provides passage for particles into the annular interior volume between the interior porous ceramic wall and the exterior wall. Furthermore, an expansion slot provides a low resistance flow path for the air thereby disrupting the flow through the ceramic and defeating the benefit provided by the porous ceramic. It is important that air continues to flow through the entire structure of the porous ceramic to insure that trapped particles are dislodged over the entirety. It has heretofore been considered impossible to provide an expansion slot in a porous ceramic without substantially altering the thickness of the ceramic in any way or without creating areas of low, or no, air flow through the porous ceramic. This problem has been solved by the present invention.

SUMMARY OF THE INVENTION

It is an object of the present invention to provide a porous ceramic comprising expansion zones allowing expansion and contraction of the ceramic without creating open passages or regions of significant thickness alterations.

It is a further object of the present invention to provide an improved effluent treatment inlet which prohibits particle settling prior to reaching the effluent treatment device and which has a longer service life than prior art inlets.

It is yet a further object of the present invention to provide an improved effluent treatment inlet, and ceramic sleeve therefore, which is more resistant to thermal stress fractures and which maintains a constant air flow through the entire sleeve without regions of flow restriction.

These and other advantages, as will be realized, are provided in a canister for maintaining entrained particles in a gas stream passing there through. The canister has an outer annular member and an inner porous annular member. The inner porous annular member has rings with at least one expansion zone in each ring. An annular interior volume is between the outer annular member and the inner porous annular member. A gas source is in flow communication with the annular interior volume for providing gas at a pressure sufficient to pass through the inner porous annular member to dislodge particles adhering thereto.

Yet another advantage is provided in a system for purifying a gas stream. The system has a process element capable of generating an effluent and a subsequent element for treating the effluent. A canister is between the process element and the subsequent element for transporting the effluent from the process element to the subsequent element without precipitation of particles entrained therein. The canister has an outer annular member an inner porous annular member with rings with at least one expansion zone in each ring. An annular interior volume is between the outer annular member and the inner porous annular member. A gas source is in flow communication with the annular interior volume providing gas at a pressure sufficient to pass through the inner porous annular member.

A particularly preferred embodiment is provided in a canister for maintaining entrained particles in a gas stream. The canister has an outer annular member and an inner porous annular member with a density of at least 10% of theoretical density to no more than 20% of theoretical density comprising rings with at least one expansion zone in each ring. At least one ring has two semicircles wherein each semicircle comprises an outer ring and an inner ring fused together with a first seam between the mating inner rings and a second seam between the mating outer rings. An annular interior volume is between the outer annular member and the inner porous annular member. A gas source is in flow communication with the annular interior volume providing gas at a pressure sufficient to pass through the inner porous annular member.

DETAILED DESCRIPTION OF THE INVENTION

Figure 1:
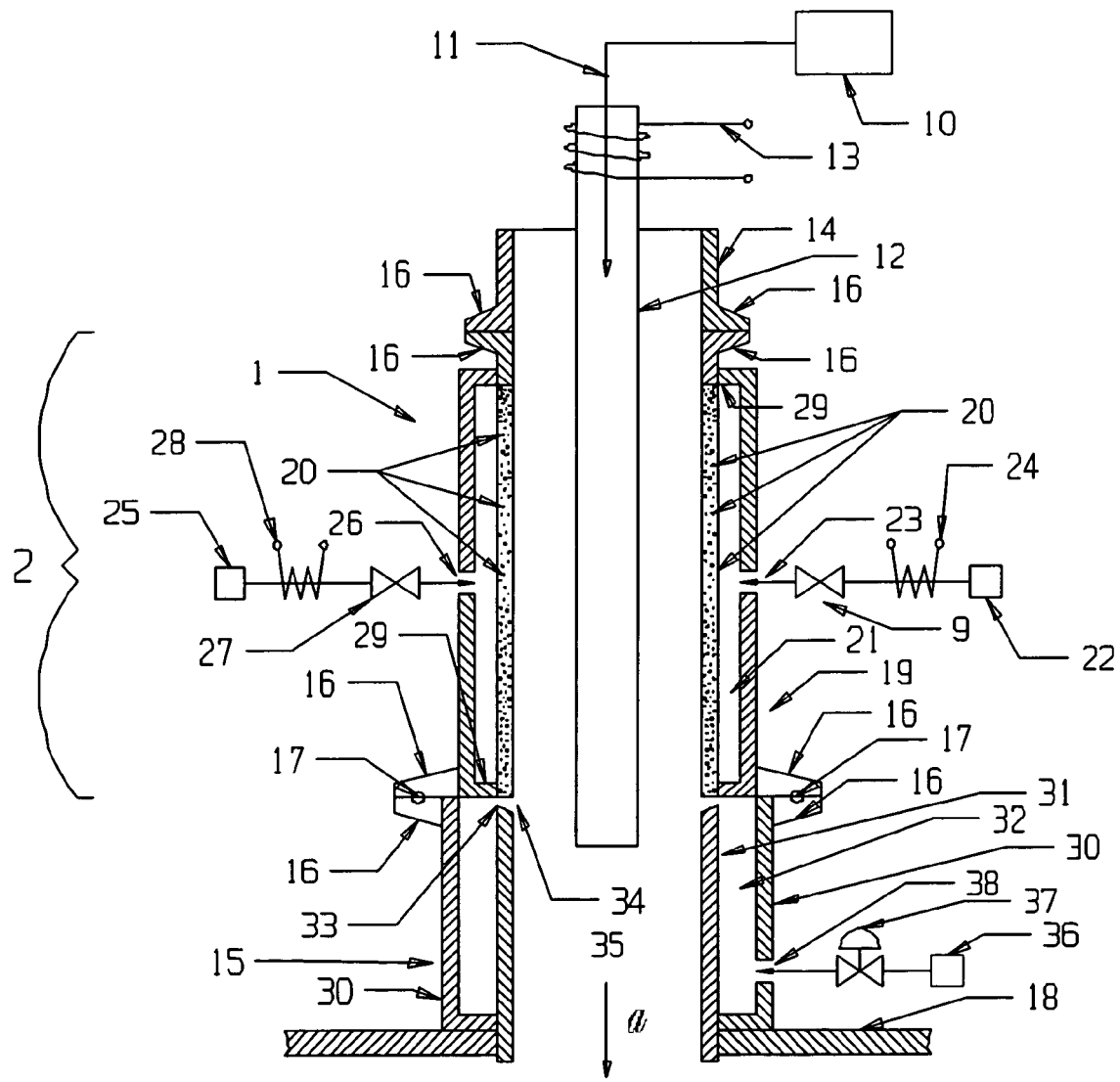
FIG. 1 illustrates an embodiment of the present invention and the improved system provided thereby.

The present invention will be described with reference to the various non-limiting drawings forming an integral part of the disclosure. In the drawings similar elements will be numbered accordingly. Unless otherwise specified percent density is percent density by weight versus theoretical maximum density.

A process inlet of the present invention is generally represented at 1 of FIG. 1. A process element, 10, generates a waste stream comprising solids and effluent gas. The waste stream passes through a conduit, 11, in the direction of the arrow, a, into an inner tubular member, 12. Thermal control devices, 13, may be employed as would be realized. A canister, 2, is connected between an upper process tube, 14, and lower process tube, 15, by mating flanges, 16, preferably with a seal, 17, such as an O-ring seal. The upper process tube, 14, provides connectivity between the process element, 10, and the canister, 2. The lower process tube, 15, provides connectivity between the canister, 2, and a subsequent process element, 18, such as a scrubber. The canister, 2, comprises an outer annular member, 19, and an inner porous annular member, 20. The inner porous annular member comprises a multiplicity of rings which will be described with more detail below. The outer annular member, 19, is a non-porous material, preferably a metal. Between the outer annular member, 19, and inner porous annular member, 20, is an annular interior volume, 21. An offset, 29, in the outer annular member, 19, may be employed to receive the inner porous annular member. A low-pressure gas source, 22, provides a flow of low-pressure gas through a port, 23, in the outer annular member into the annular interior volume, 21. The low-pressure gas is regulated by a check valve, 9, and may be heated by an optional heating element, 24, such as a resistive element. The low-pressure gas passes through the porous annular member, 20, thereby inhibiting particles from adhering thereto. An optional high-pressure gas source, 25, also provides a flow of high-pressure gas through a port, 26, in the outer annular member, 19. The high-pressure gas is regulated by a check valve, 27, and is further optionally heated by a heating element, 28, such as a resistive element. The high-pressure gas is used to dislodge particles that adhere to the inner porous annular member in spite of the low flow gas. The low-pressure flow is used most frequently during operation with the high gas flow used on an infrequent basis based on reduction in flow across the porous ceramic or other parameters selected by the operator.

The lower process tube, 15, optionally, and preferably, has a multi-walled configuration with an outer annular wall, 30, and inner annular wall, 31. An annular volume, 32, is formed between the outer annular wall and inner annular wall. The inner annular wall is preferably shorter than the outer annular wall terminating at a beveled edge, 33, to form a port, 34, into the inner volume, 35. A water supply, 36, controlled by a valve, 37, is attached to a port, 38, of the outer annular wall of the lower process tube to provide an initial scrubbing of the effluent.

Figure 2:
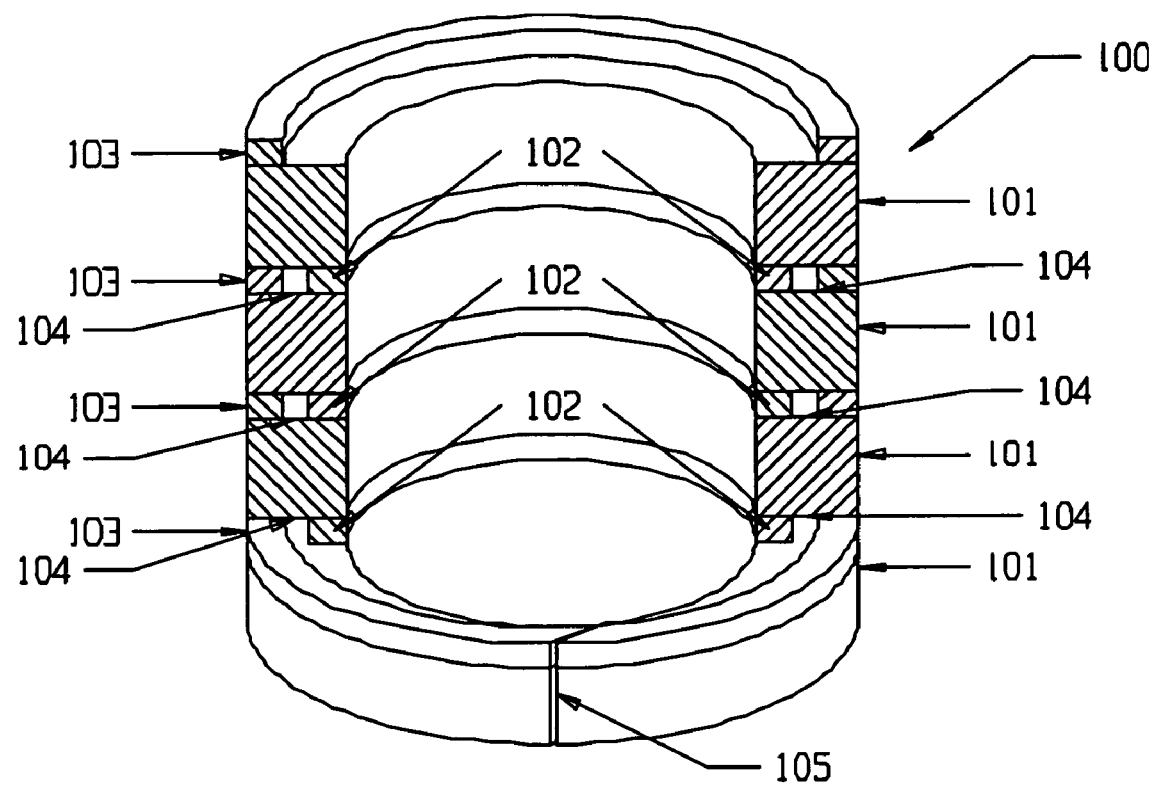
FIG. 2 is a partial cut-away of a portion of the inner porous annular member of an embodiment of the present invention.

An embodiment of a portion, 100, of the inner porous annular member is illustrated in partial cutaway in FIG. 2. The inner porous annular member comprises a multiplicity of nestled rings, 101, to form an embedded stack. Each ring is substantially identical with an inner ring, 102, and an outer ring, 103, combined at a fused region, 104. The interior diameter of the outer ring is approximately the same as the outer diameter of the inner ring such that subsequent rings can be nestled with the inner ring received by the outer ring to form a cylinder. The inner ring and outer ring are preferably approximately the same thickness as measured from the inner portion to the outer portion. While not limited to any theory it is hypothesized that as the thickness of the inner ring outer ring and fused section become approximately equal the thermal expansion of the ring approaches uniformity thereby decreasing stress fractures. One of skill in the art would realize that it is preferable to manufacture the rings at a thickness selected to substantially minimize thermal gradient which can cause the ring to crack upon firing.

Figure 3:
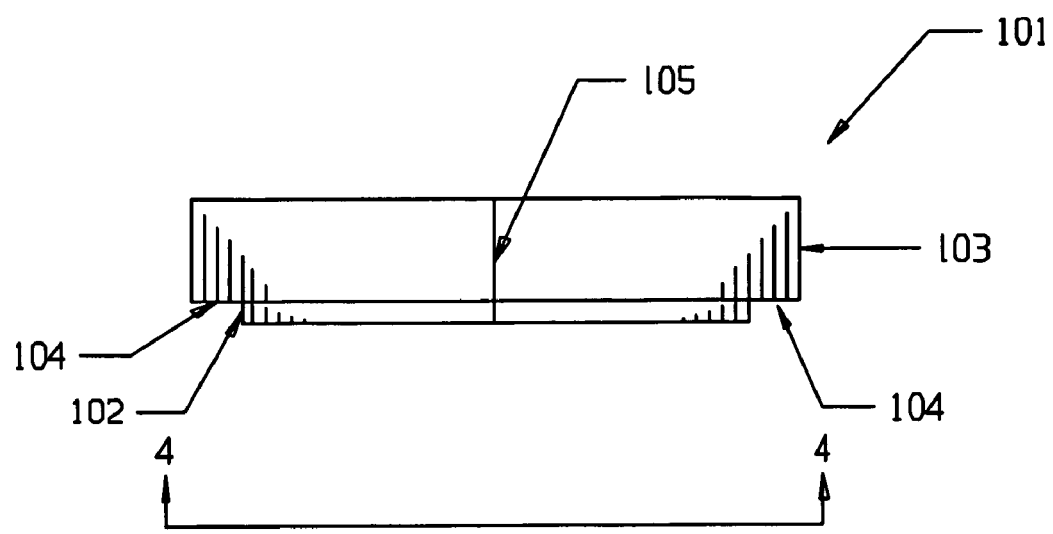
FIG. 3 is a side view of an inner porous annular member of FIG. 2.
Figure 4:
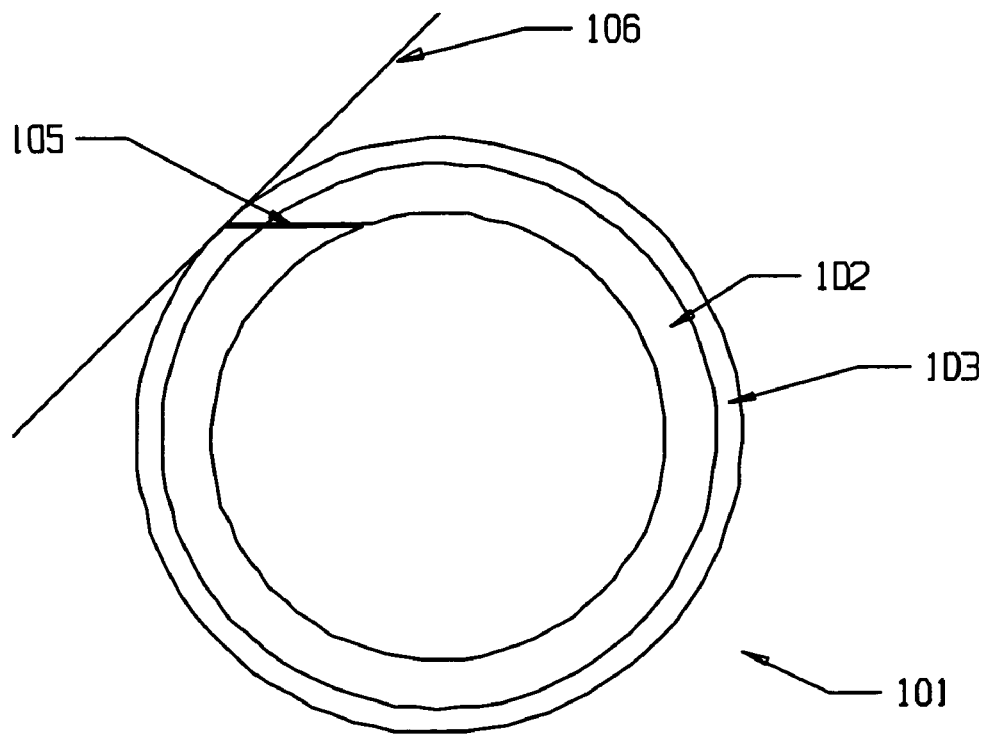
FIG. 4 is a top view of the inner porous annular member taken along line 4-4 of FIG. 3.

FIG. 3 illustrates an individual ring, 101, in cross-section and FIG. 4 illustrates the ring of FIG. 3 taken along line 4-4 of FIG. 3. The inner ring, outer ring and ledge are as seen in FIG. 2. Each ring further comprises at least one offset expansion zone, 105, passing from the exterior of the ring to the interior of the ring. The offset expansion zone is approximately planar and the projection of the plane excludes the central rotational axis of the ring. The offset expansion zone forms an angle with the tangent, 106, of the ring. The angle is preferably at least 10° to no more than 80° and is preferably formed by cutting the ring after formation. More preferably, the angle is at least 30° to no more than 60°. As the ring expands the portions on either side of the offset expansion zone can slide against the other thereby insuring that no voids are presented in the entirety of the porous annular wall.

Figure 5:
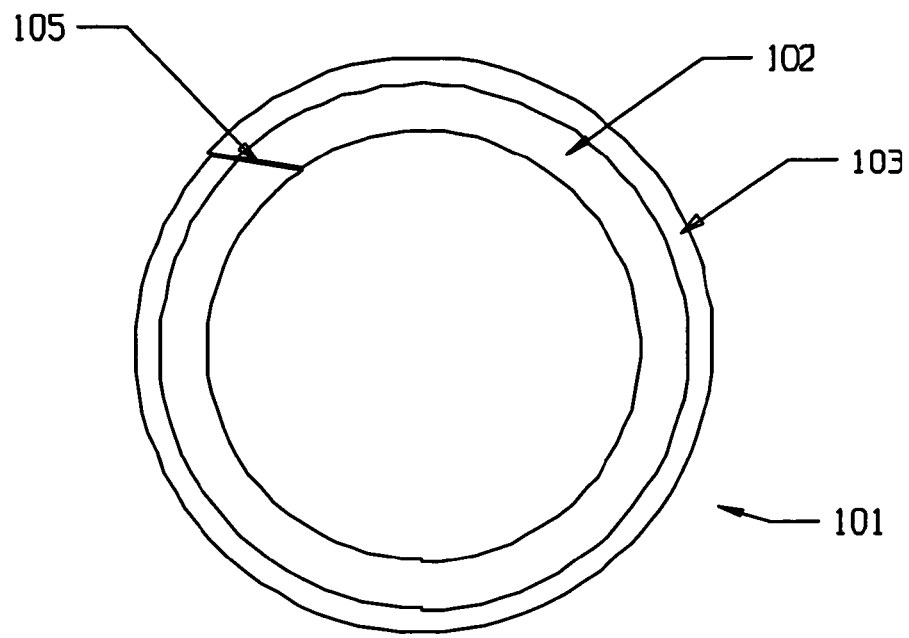
FIG. 5 is a top view of an inner porous annular member of FIG. 2 illustrated as expanded from high temperature treatment.

The offset expansion zone is illustrated as being at an angle with respect to the tangent, 106, of the ring. The offset expansion zone allows the ring to expand as shown in FIG. 5 thereby reducing stress and fractures caused thereby while still maintaining a relatively constant thickness of porous ceramic. A relatively constant thickness of porous ceramic is necessary to maintain adequate flow through the various portions of the porous ceramic. For the purposes of the present invention adequate flow through the various portions of the porous ceramic is defined as sufficient flow that specific areas of particle buildup are avoided. It would be apparent to one of skill in the art that a low flow region would be more susceptible to particle buildup since the flow of air through the porous ceramic is insufficient to dislodge the particles. Additional offset expansion zones may be incorporated and, in fact, two offset expansion zones are preferable.

Figure 6:
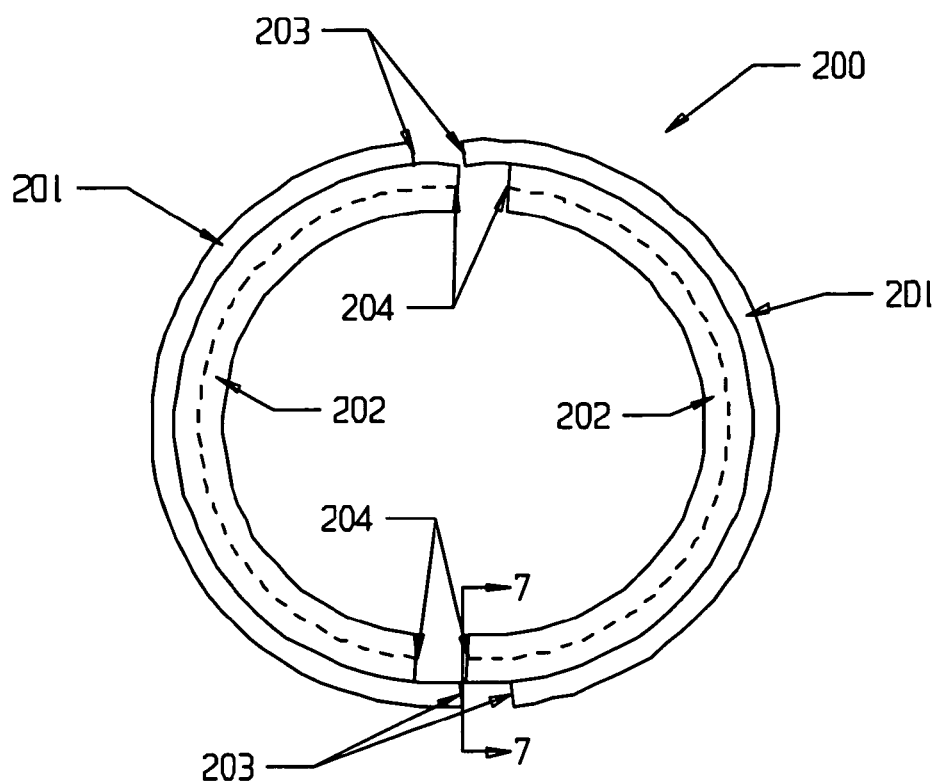
FIG. 6 is an exploded view of an embodiment of the inner porous annular member of the present invention.
Figure 7:
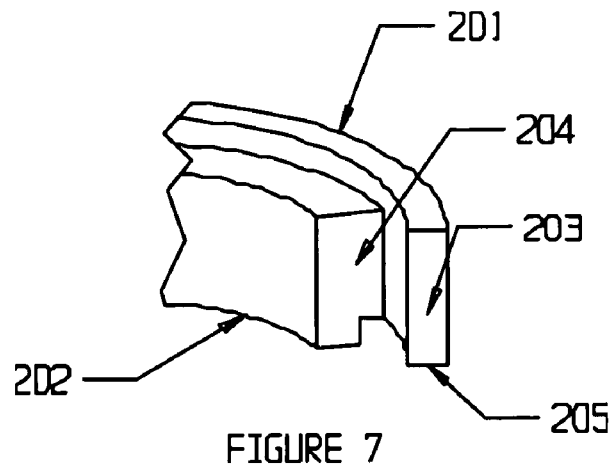
FIG. 7 is a partial view of the embodiment taken along line 6-6 of FIG. 6

A preferred embodiment ring, 200, is illustrated in top exploded view in FIG. 6. The embodiment of FIG. 6 comprises an outer ring, 201, and an inner ring, 202, overlapped at a fused region 205. In use multiple rings form an embedded stack with the inner ring interior to the exterior ring as illustrated previously. The ring comprises multiple semicircular mating elements which, taken together, form the ring with an expansion zone typically referred to as a ship-lap joint on opposite sides of the ring. The expansion zone comprises a first seam between the outer rings and a second seam between the inner rings wherein the first and second seams are not co-planar. In use, a pair of mating elements are placed into contact relationship thereby forming a ring. A second pair of mating elements are placed on the first pair wherein the inner rings of the second pair are in contact at the seam and interior to the outer ring of the lower assembly. It is most preferred that the seams of each successive assembly be positioned such that successive seams are not collinear. A filler ring with expansion zones can be used in the initial layer to receive the initial inner ring at the first mating element.

Figure 8:
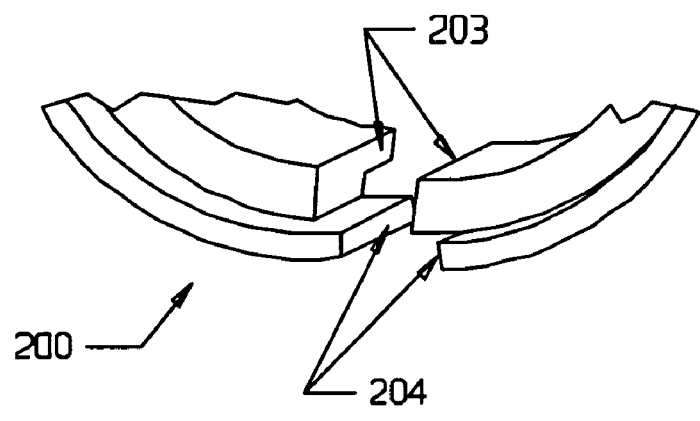
FIG. 8 is a partial exploded view of an expansion zone of the embodiment of FIG. 6.
Figure 9:
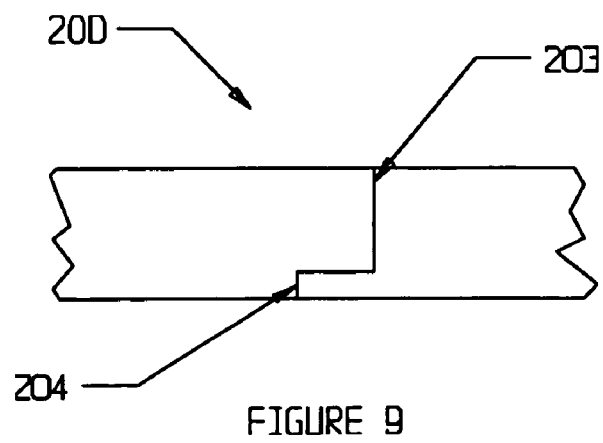
FIG. 9 is a partial view of an expansion zone of the embodiment of FIG. 6 as employed.

The expansion zone is shown in partial exploded view in FIG. 8 and as employed in FIG. 9. As realized from FIG. 9 a particular advantage is that the porous ceramic abuts thereby eliminating low resistant air passages.

The process for manufacturing the porous ceramic involves the technique referred to in the art as sponge replication. This technique involves forming an open cell foam in the shape of the intended porous ceramic. The open cell foam is then saturated with a ceramic precursor solution such that the pores of the open cell foam are adequately filled with ceramic precursor. The entire assembly is then dried to form a green ceramic precursor followed by heating at elevated temperature to remove the foam, solvents, and all organic matter and to sinter the ceramic precursors. As would be realized the ceramic structure corresponds with those areas which were voids in the open cell foam and the voids in the ceramic correspond to those areas which were structure in the open cell foam.

The open cell foam preferably has a plurality of interconnected voids surrounded by a web of flexible foam material.

The open cell foam can be made of any material which can be impregnated with ceramic precursor and which can be removed by heating. Generally, any combustible organic plastic foam may be used which has resilience and the ability to recover to original shape. Preferred open cell foams are typically polymeric organic materials such as polyurethane and cellulosic foams. A particularly preferred material is polyurethane due to the low cost, ready availability and the ease with which the material can be made into various shapes.

In the preferred process, a reticulated organic polymer foam is impregnated with aqueous slurry of ceramic precursor. Detailed procedures are described in U.S. Pat. Nos. 3,962,081; 4,075,303 and 4,024,212 which are incorporated herein by reference thereto. The flexible foam material is impregnated such that the ceramic slurry coats the fiber-like webs of the foam and substantially fills the voids therein. It is typically preferred to simply immerse the foam in the slurry for a short period of time sufficient to ensure that the foam is nearly completely impregnated. The impregnated foam can then be compressed to expel a portion of the slurry while leaving the fiber-like web portion coated therein with a plurality of pores throughout the body.

In an alternative embodiment a ceramic precursor comprising spherically shaped voids therein can be formed into the desired shape of the porous ceramic and fired as described in U.S. Pat. No. 6,773,825 which is incorporated herein by reference thereto.

A mixture of ceramic or metal particles and pliable organic spheres is prepared into a liquid, or suspension, and the mixture is formed into a shaped article. The shaped article is dried and fired so that the particles are bonded by sintering. The organic spheres and other organic additives are volatilized. The spheres are preferably low density and more preferably hollow. The size of the voids may be preselected by selecting the appropriate polymer spheres. The porosity is also easily controlled by the number of polymer spheres added. It is most preferred that the polymer spheres are each in contact with at least two other spheres such that a network of voids is created in the eventual diffuser.

Ceramic precursors typically include a solvent, such as water, organic binders, and materials which, upon heating, form a ceramic. The ceramic precursor is preferably a ceramic slurry which is thixotropic, has a reasonable degree of fluidity and a rheology such that the slurry will tend to stay in place when work is not applied to it. This is typically referred to as a high yield strength.

Ceramic precursors typically include ceramic powders or slurries. Preferred materials include metals or metal alloys, such as copper, brass, stainless steel, alumina or FeCrAlY which is a known alloy of iron, chromium, aluminum and yttrium; silicon carbide, zirconium and cordierite bonded with phosphates; silica, fumed or colloidal; or glass frit such as calcium borosilicate glass.

The article is typically dried by suitable means, such as air drying, accelerated drying at a temperature of about 100° F. to 600° F. for about 15 minutes to 6 hours, microwave drying or the like. After drying the material is fired at elevated temperatures preferably in excess of about 2000° F. to sinter the ceramic and volatilize the organics. Heating to temperatures as high as 2500° F. can be used. Firing times at or near the peak temperature for at least 5 minutes is preferred and at least 10-15 minutes is more preferred. Heating temperature and time can vary depending on the type of furnace, ceramic used and other criteria such the incorporation of glazes and other adjuvants.

The elements are preferably manufactured by forming the intended shape prior to firing. Alternatively, components of the final shape can be prepared and combined at firing. In either case the various sections are referred to herein as fused.

The density of the porous ceramic is preferably at least about 10% of theoretical density to no more than about 20% of theoretical density. Below about 10% of theoretical density the porous ceramic becomes fragile and susceptible to fracture. Above about 20% of theoretical density the porosity is too low to allow adequate air-flow through the porous ceramic under typical operating conditions. More preferably, the density of the porous ceramic is about 13 to about 18% of theoretical density with about 15% of theoretical density being optimum.

The pore size of the porous ceramic is preferably about 3 to about 100 pores per inch (ppi) with about 20 to about 50 ppi being more preferred. A pore size of about 25-35 ppi is even more preferred with about 30 ppi being optimum.

The preferred ceramic composition is a zirconium yttrium alumina composite comprising about 40 to about 80% zirconia, about 1.1-3.4% yttria and the balance being essentially alumina. The zirconium yttrium alumina composite is described in U.S. Pat. No. 5,045,511 which is incorporated herein by reference.

The process element providing the effluent is not particularly limited herein. The present invention is suitable for any application wherein transportation of a flowing gas comprising entrained particles is desirable, and particularly, wherein particle separation is to be avoided. Particular processes include semiconductor manufacturing and photovoltaic processing using methods such as oxidation, gas scrubbing, particulate solids removal and the like. The subsequent process is also not particularly limiting and includes any type of scrubbing operation or operation that separates entrained particles from a stream of air in a controlled manner.

In the present invention the materials of construction are not limiting but selected based on the operation and materials to which the various components will be exposed.

The invention has been described with particular reference to the preferred embodiments. Other embodiments and alterations could be realized based on the teachings herein without departing from the scope of the invention which is set forth in the claims appended hereto.

The invention claimed is:

1. A canister for maintaining entrained particles in a gas stream passing therethrough comprising:
   an outer annular member;
   an inner porous annular member comprising rings with at least one expansion zone in each ring;
   an annular interior volume between said outer annular member and said inner porous annular member; and
   a gas source in flow communication with said annular interior volume providing gas at a pressure sufficient to pass through said inner porous annular member.

2. The canister of claim 1 wherein said expansion zone comprises a linear slot at an angle with a tangent of said ring.

3. The canister of claim 2 wherein said angle is at least 10° to no more than 80°.

4. The canister of claim 1 wherein at least one ring of said rings comprise an outer ring and inner ring fused together with a first seam in said inner ring and a second seam in said outer ring.

5. The canister of claim 4 wherein said first seam and said second seam are not coplanar.

6. The canister of claim 1 wherein at least one ring of said rings comprises two semicircles wherein each semicircle comprises an outer ring and an inner ring fused together with a first seam between said mating inner rings and a second seam between said mating outer rings.

7. The canister of claim 6 wherein said first seam and said second seam are not coplanar.

8. The canister of claim 1 wherein said rings are in an embedded stack.

9. The canister of claim 1 wherein said inner porous annular member has a density of at least about 10% to no more than 20% of theoretical density.

10. The canister of claim 1 wherein said expansion zone allows said inner porous member to expand or contract without allowing said particles to pass therethrough.

11. A system for purifying a gas stream comprising:
   a process element capable of generating an effluent;
   a subsequent element for treating said effluent; and
   a canister between said process element and said subsequent element for transporting said effluent from said process element to said subsequent element without precipitation of particles entrained therein wherein said canister comprises:
   an outer annular member;
   an inner porous annular member comprising rings with at least one expansion zone in each ring;
   an annular interior volume between said outer annular member and said inner porous annular member; and
   a gas source in flow communication with said annular interior volume providing gas at a pressure sufficient to pass through said inner porous annular member.

12. The system of claim 11 wherein said expansion zone comprises a linear slot at an angle with a tangent of said ring.

13. The system of claim 12 wherein said angle is at least 10° to no more than 80°.

14. The system of claim 11 wherein at least one ring of said rings comprise an outer ring and inner ring fused together with a first seam in said inner ring and a second seam in said outer ring.

15. The system of claim 14 wherein said first seam and said second seam are not coplanar.

16. The system of claim 11 wherein at least one ring of said rings comprises two semicircles wherein each semicircle comprises an outer ring and an inner ring fused together with a first seam between said mating inner rings and a second seam between said mating outer rings.

17. The system of claim 16 wherein said first seam and said second seam are not coplanar.

18. The system of claim 11 wherein said inner porous annular member has a density of at least about 10% to no more than 20% of theoretical density.

19. A canister for maintaining entrained particles in a gas stream comprising:
   an outer annular member;
   an inner porous annular member, with a density of at least about 10% to no more than 20% of theoretical density, comprising rings with at least one expansion zone in each ring wherein at least one ring of said rings comprises two semicircles wherein each semicircle comprises an outer ring and an inner ring fused together with a first seam between said mating inner rings and a second seam between said mating outer rings;
   an annular interior volume between said outer annular member and said inner porous annular member; and
   a gas source in flow communication with said annular interior volume providing gas at a pressure sufficient to pass through said inner porous annular member.

20. The canister of claim 19 wherein said first seam and said second seam